No. 654,664. Patented July 31, 1900.
T. J. MORGAN.
LUBRICATOR.
(Application filed May 8, 1900.)
(No Model.)
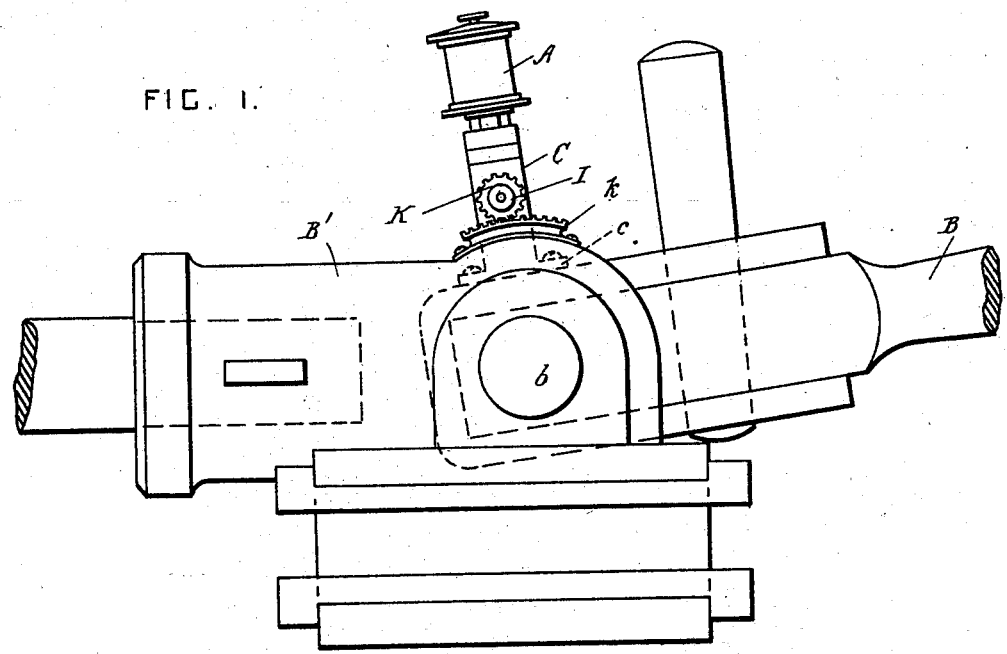
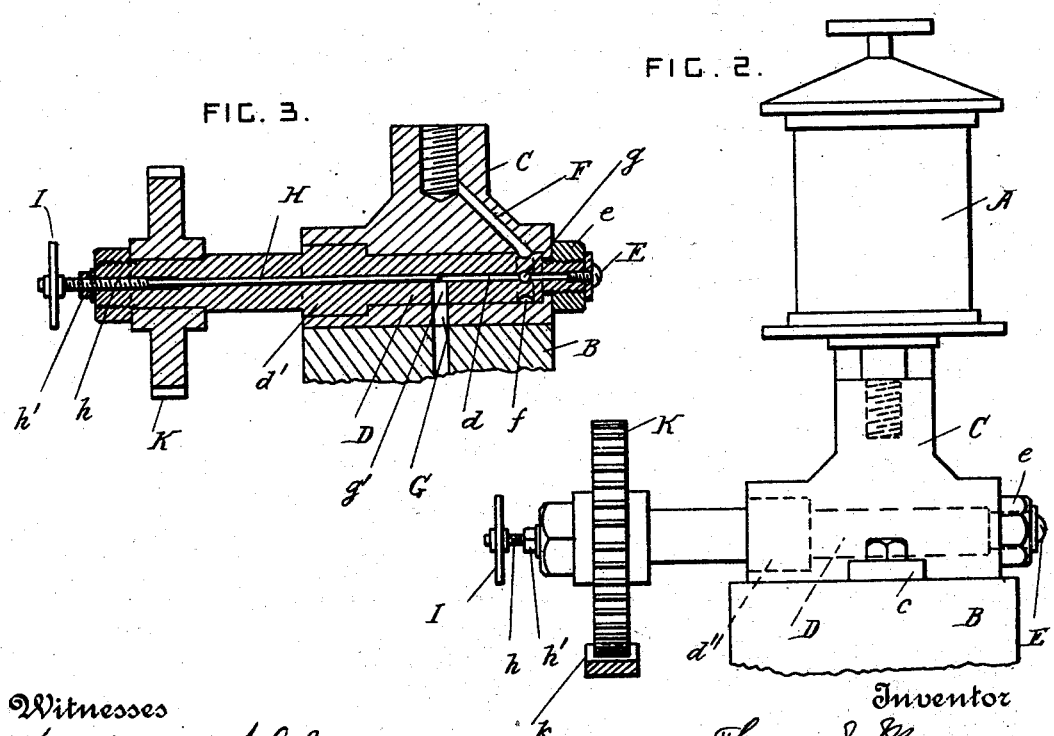
Witnesses
Walter Allen
E. H. Bates
Inventor
Thomas J. Morgan
By Attorney Herbert W. T. Jenner

UNITED STATES PATENT OFFICE.

THOMAS J. MORGAN, OF KINGSTON, PENNSYLVANIA.

LUBRICATOR.

SPECIFICATION forming part of Letters Patent No. 654,664, dated July 31, 1900.

Application filed May 8, 1900. Serial No. 15,894. (No model.)

*To all whom it may concern:*

Be it known that I, THOMAS J. MORGAN, a citizen of the United States, residing at Kingston, in the county of Luzerne and State of Pennsylvania, have invented certain new and useful Improvements in Lubricators; and I do hereby declare the following to be a full, clear, and exact description of the invention, such as will enable others skilled in the art to which it appertains to make and use the same.

This invention relates to lubricators for crank-pins, cross-head pins, and other movable parts of engines or machinery; and it consists in the novel construction and combination of the parts hereinafter fully described and claimed.

In the drawings, Figure 1 is a side view of a cross-head provided with a lubricator according to this invention. Fig. 2 is a front view of the lubricator. Fig. 3 is a longitudinal section through the lubricator-valve.

A is a lubricator cup or reservoir for holding a supply of oil or other lubricant. This oil-cup is of any approved form and construction.

B is a portion of an engine connecting-rod, and $b$ is the pin to be lubricated.

C is a valve-casing interposed between the oil-cup and the connecting-rod. The oil-cup is preferably screwed into the valve-casing, and the valve-casing has lugs $c$ and screws for securing it to the connecting-rod. The valve-casing may be secured in a similar manner to any other movable part of an engine or machine which has a pin or other surface which requires to be kept constantly lubricated.

D is a valve which is journaled in the valve-casing C and provided with an oil-passage $d$, extending through it from one end to the other. The valve D has a collar $d'$, which runs oil-tight in a recess in one end of the valve-casing, and $e$ is a nut screwed on the end portion of the valve which projects through the valve-casing. This nut holds the valve in oil-tight relation with its casing, so that no oil can leak out at the ends of the valve-casing.

E is a screw or plug which closes one end of the passage $d$ through the valve.

F is an inlet passage or hole in the valve-casing which connects the oil-cup with a circumferential groove $f$ in the valve D. The valve D is provided with a lateral hole $g$, which connects its groove $f$ with the oil-passage $d$, and a second lateral hole $g'$, which connects its passage $d$ with an outlet-hole G in the casing. The hole G in the casing is constantly connected with the pin or other surface to be lubricated. The passage $d$ is constantly connected with the oil-cup by means of the groove $f$ and the inlet holes or passages F and $g$, so that the oil-passage $d$ in the valve is constantly filled with oil. Motion is imparted to the valve, so that the outlet-hole $g'$ in the valve is intermittently connected with the outlet-hole G in the casing, and the oil passes from the passage $d$ to the pin when the holes $g'$ and G are connected. The amount of oil which passes through the hole $g'$ is regulated by a spindle H, which slides longitudinally in the passage $d$ over the hole $g'$, so that the outlet through the hole $g'$ can be regulated. The spindle H has a screw-threaded portion $h$, which is screwed into one end of the passage $d$, and $h'$ is a nut for locking the spindle after its position has been adjusted.

I is a wheel or handle secured on the projecting end of the spindle for revolving it.

K is a toothed pinion secured on the projecting end portion of the valve. A rotary or an oscillatory motion is imparted to the valve by means of this pinion in any approved manner. A toothed rack or segment $k$ is secured on the engine cross-head B' and gears into the pinion K. The toothed rack is secured concentric with the pin $b$ to be lubricated, and the valve D is oscillated as the cross-head moves back and forth. When the lubricator is secured to the other end of the connecting-rod, the segment may be replaced by a toothed wheel which is secured to the crank-pin to be lubricated. The valve D may be rotated or oscillated by any other equivalent means—for instance, it may be oscillated by tappet mechanism of any approved construction, so that it may be operated by the motion of the parts with which it is connected. The valve is operated continuously by its driving mechanism, so that the lubricant is discharged periodically, and the circumferential groove $f$ enables the passage $d$ to be kept constantly full of oil irrespective of the amplitude of the oscillation of the valve, and even permits the valve to be revolved continuously in either direction. The oil is therefore discharged periodically in equal quantities as long as the speed of the driving mechanism is uniform.

By using a cylindrical valve with shoulders at each end instead of a tapering plug-valve the main cylindrical portion of the valve can be made oil-tight without pressing on the wall of the chamber in which it works. As the main portion of the valve does not press upon the chamber like a plug-valve it does not wear away on one side like a plug-valve, as all the wear comes on the shoulders at its ends, which can be set up from time to time without making the main portion of the valve press against the chamber it works in.

What I claim is—

1. In a lubricator, the combination, with an oil-cup, and a valve-casing under it provided with an inlet and an outlet arranged out of line with each other; of a valve journaled in the said casing and provided with a circumferential groove constantly communicating with the said inlet, a longitudinal passage, a lateral hole connecting the said passage and groove, and a lateral opening from said passage through the valve for communicating periodically with the said outlet; and driving mechanism operating the said valve so that the lubricant is discharged periodically, substantially as set forth.

2. In a lubricator, the combination, with an oil-cup, and a valve-casing under it provided with an inlet and an outlet arranged out of line with each other; of a cylindrical valve journaled in the casing and provided with shoulders at its ends which bear against the casing, said valve having also a circumferential groove constantly communicating with the said inlet, a longitudinal passage, a lateral hole connecting the said passage and groove, and a lateral opening from the said passage through the valve for communicating periodically with the said outlet; means for holding the said shoulders in oil-tight relation with the casing, and driving mechanism operating the said valve so that the oil is discharged periodically, substantially as set forth.

In testimony whereof I affix my signature in presence of two witnesses.

THOMAS J. MORGAN.

Witnesses:
JAMES COOL,
FRANK FERTICK.